United States Patent
Jung

(10) Patent No.: US 8,804,034 B2
(45) Date of Patent: Aug. 12, 2014

(54) APPARATUS AND METHOD FOR CONVERTING IMAGE IN AN IMAGE PROCESSING SYSTEM

(75) Inventor: Jae-Woo Jung, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 12/838,692

(22) Filed: Jul. 19, 2010

(65) Prior Publication Data

US 2011/0013082 A1 Jan. 20, 2011

(30) Foreign Application Priority Data

Jul. 17, 2009 (KR) ........................ 10-2009-0065614

(51) Int. Cl.
*H04N 7/01* (2006.01)
*H04N 11/20* (2006.01)

(52) U.S. Cl.
USPC ........................................ 348/446; 348/448

(58) Field of Classification Search
USPC ................................ 348/441–459
See application file for complete search history.

(56) References Cited

U.S. PATENT DOCUMENTS

| 5,446,497 | A | * | 8/1995 | Keating et al. ................. | 348/443 |
| 5,742,343 | A | | 4/1998 | Haskell et al. | |
| 5,963,261 | A | | 10/1999 | Dean | |
| 6,229,571 | B1 | * | 5/2001 | Sato .............................. | 348/446 |
| 2005/0024391 | A1 | | 2/2005 | Damera-Venkata et al. | |
| 2005/0063586 | A1 | | 3/2005 | Munsil et al. | |
| 2005/0129306 | A1 | | 6/2005 | Wang et al. | |
| 2007/0177034 | A1 | | 8/2007 | Kim | |
| 2010/0157146 | A1 | | 6/2010 | Jung et al. | |

FOREIGN PATENT DOCUMENTS

| CN | 101009761 A | 8/2007 |
| KR | 10-2005-0014734 A | 2/2005 |
| KR | 10-2005-0059407 A | 6/2005 |
| KR | 10-2010-0073725 A | 1/2010 |
| WO | 97/41684 A1 | 11/1997 |
| WO | 2010/074521 A2 | 7/2010 |

OTHER PUBLICATIONS

International Search Report (PCT/ISA/210) dated Feb. 22, 2011, in international application No. PCT/KR2010/004718.
Communication dated Oct. 9, 2013 issued by the European Patent Office in counterpart European Patent Application No. 10800077.9.
Dong-Ho Lee, et al., "HDTV Standard Conversion", Proceedings of the International Conference on Consumer Electronics, Jun. 8-10, 1993, pp. 36-37, XP000427515.
Communication dated Dec. 24, 2013 issued by the State Intellectual Property Office of the People's Republic of China in counterpart Chinese Patent Application No. 201080032352.5.

\* cited by examiner

*Primary Examiner* — Michael Lee
(74) *Attorney, Agent, or Firm* — Sughrue Mion, PLLC

(57) ABSTRACT

A method and apparatus for converting an image in an image processing system are provided, in which if a plurality of low-definition video frames are used for converting a low-definition picture to a high-definition picture, a weight is determined for each of the plurality of low-definition video frames, and one of two image fields that form a high-definition video frame is generated using the plurality of low-definition video frames according to the weights of the plurality of low-definition video frames.

19 Claims, 6 Drawing Sheets

APPARATUS AND METHOD FOR CONVERTING IMAGE IN AN IMAGE PROCESSING SYSTEM

CROSS-REFERENCE TO RELATED PATENT APPLICATION

This application claims priority from Korean Patent Application No. 10-2009-0065614 filed in the Korean Intellectual Property Office on Jul. 17, 2009, the entire disclosure of which is hereby incorporated by reference.

BACKGROUND

1. Field

The exemplary embodiments generally relate to an apparatus and method for converting an image in an image processing system. More particularly, the exemplary embodiments relate to an apparatus and method for converting a low-definition picture to a high-definition picture in an image processing system.

2. Description of the Related Art

In general, digital images are displayed on a screen by interlaced scanning or progressive scanning according to the configuration of a frame. A high-definition picture is acquired by the interlaced scanning, whereas a low-definition picture is acquired by the progressive scanning.

A frame is realized by scanning odd-numbered lines in a top field and scanning even-numbered lines in a bottom field in the interlaced scanning scheme. Therefore, the height of each field is equal to half the height of the frame. The interlaced scanning is adopted to realize a high-definition screen such as 1920×1280 in a High Definition TV (HDTV).

Compared to the interlaced scanning, the progressive scanning forms a frame by sequentially scanning an image, line by line. The progressive scanning is used to acquire a low-definition screen such as 1280×720 in a computer monitor, a digital TV, etc.

Accordingly, there exists a need for, upon input of a low-definition picture, converting the low-definition picture to a high-definition picture in an image processing system capable of simultaneously processing a low-definition picture supporting the progressive scanning and a high-definition picture supporting the interlaced scanning.

The image processing system should also be able to minimize the amount of additional information required for converting a low-definition picture to a high-definition picture.

SUMMARY

An aspect of exemplary embodiments of the present invention is to address at least the problems and/or disadvantages and to provide at least the advantages described below. Accordingly, an aspect of exemplary embodiments of the present invention is to provide an apparatus and method for converting a low-definition picture to a high-definition picture in an image processing system.

Another aspect of exemplary embodiments of the present invention provides an apparatus and method for converting a low-definition picture to a high-definition picture according to characteristics of a source picture in an image processing system.

Another aspect of exemplary embodiments of the present invention provides an apparatus and method for converting a low-definition picture to a high-definition picture in such a manner that the pixel values of a residual image are minimized in an image processing system.

A further aspect of exemplary embodiments of the present invention provides an image conversion apparatus and method for reflecting the importance of a plurality of low-definition video frames when a high-definition video frame is generated using the plurality of low-definition video frames in an image processing system.

In accordance with an aspect of exemplary embodiments of the present invention, there is provided a method for converting an image in an image processing system, in which if a plurality of low-definition video frames are used for converting a low-definition picture to a high-definition picture, a weight is determined for each of the plurality of low-definition video frames, and one of two image fields that form a high-definition video frame is generated using the plurality of low-definition video frames according to the weights of the plurality of low-definition video frames.

In accordance with another aspect of exemplary embodiments of the present invention, there is provided an image conversion apparatus in an image processing system, in which if a plurality of low-definition video frames are used for converting a low-definition picture to a high-definition picture, a controller determines a weight for each of the plurality of low-definition video frames, and a converter generates one of two image fields that form a high-definition video frame using the plurality of low-definition video frames according to the weights of the plurality of low-definition video frames.

In accordance with another aspect of exemplary embodiments of the present invention, there is provided a method for converting an image in an image processing system, in which when a high-definition picture is to be generated using a single low-definition video frame, a top field and a bottom field that form the high-definition picture are generated using the single low-definition video frame, when the high-definition picture is to be generated using two consecutive low-definition video frames without applying any weight to the two consecutive low-definition video frames, the top field of the high-definition picture is generated using a preceding low-definition video frame between the two consecutive low-definition video frames and the bottom field of the high-definition picture is generated using the two consecutive low-definition video frames, and when the high-definition picture is to be generated using the two consecutive low-definition video frames according to weights for the two consecutive low-definition video frames, the top field of the high-definition picture is generated using the preceding low-definition video frame between the two consecutive low-definition video frames and the bottom field of the high-definition picture is generated by applying the weights to the two consecutive low-definition video frames.

In accordance with a further aspect of exemplary embodiments of the present invention, there is provided an image conversion apparatus in an image processing system, in which a top field generator generates a top field of a high-definition picture using a single low-definition video frame or using a preceding low-definition video frame between two consecutive low-definition video frames, and a bottom field generator generates a bottom field of the high-definition picture using the single low-definition video frame or the two consecutive low-definition video frames. The top field generator generates the top field of the high-definition picture using the single low-definition video frame, when the high-definition picture is to be generated using the single low-definition video frame, generates the top field of the high-definition picture using the preceding low-definition video frame between the two consecutive low-definition video frames, when the high-definition picture is to be generated using the two consecutive low-definition video frames without applying any weight to the two consecutive low-definition video frames, and generates the top field of the high-definition picture using the preceding low-definition video frame between the two consecutive low-definition video frames, when the high-definition picture is to be generated using the two consecutive low-definition video frames without applying any weight to the two consecutive low-definition video frames. The bottom field generator generates the bottom field of the high-definition picture using the single low-definition video frame, when the high-definition picture is to be generated using the single low-definition video frame, generates the bottom field of the high-definition picture using the two consecutive low-definition video frames, when the high-definition picture is to be generated using the two consecutive low-definition video frames without applying any weight to the two consecutive low-definition video frames, and generates the bottom field of the high-definition picture by applying the weights to the two consecutive low-definition video frames, when the high-definition picture is to be generated using the two consecutive low-definition video frames according to the weights for the two consecutive low-definition video frames.

BRIEF DESCRIPTION OF THE DRAWINGS

The above and other features and aspects of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

The following description is made with the appreciation that an image processing system for simultaneously processing a low-definition picture and a high-definition picture is a hierarchical image processing system, by way of example. However, it is to be understood that the exemplary embodiments of the present invention are applicable to every image processing system that simultaneously processes a low-definition picture and a high-definition picture.

For the input of a source picture, the hierarchical image processing system outputs both a low-definition picture and a high-definition picture. The low-definition picture may be scanned by progressive scanning, for example, and the high-definition picture may be scanned by interlaced scanning, for example.

In accordance with an exemplary embodiment of the present invention, for upconversion of a low-definition picture to a high-definition picture, the number of low-definition pictures to be used for the upconversion and, in case of a plurality of low-definition pictures, the importance of each low-definition picture are determined, taking into account characteristics of the source picture. The importance of each low-definition picture is reflected as a weight applied to the low-definition picture.

To this end, a description will be made of the configuration and operation of the hierarchical image processing system and the configuration and operation of an image conversion apparatus in the hierarchical image processing system according to exemplary embodiments of the present invention.

A. Configuration and Operation of the Hierarchical Image Processing System

A description will be made below of the configuration and operation of a hierarchical image processing system to which an image conversion method is applied according to an exemplary embodiment of the present invention.

Figure 1:
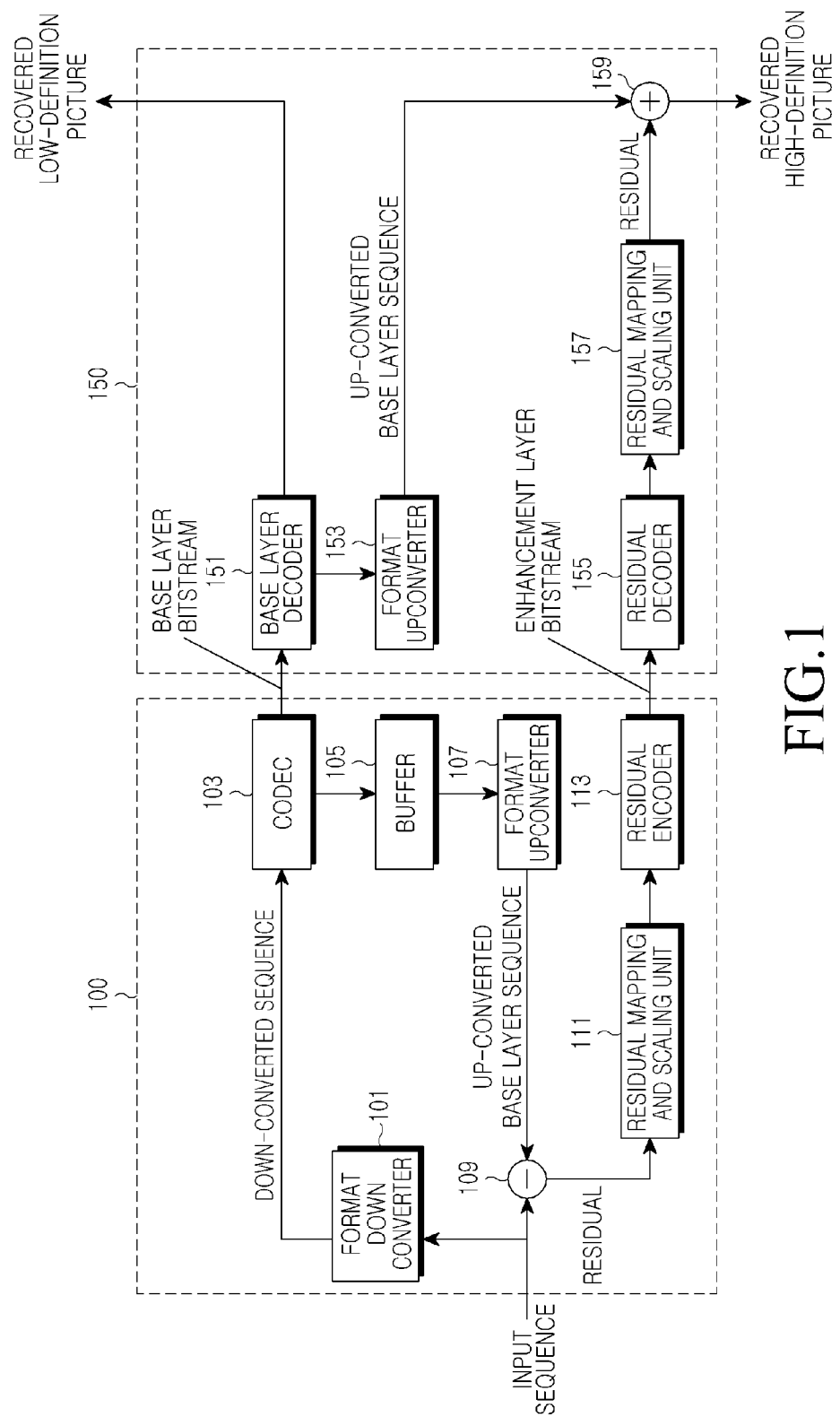
FIG. 1 is a block diagram of a hierarchical image processing system according to an exemplary embodiment of the present invention.

FIG. 1 is a block diagram of a hierarchical image processing system according to an exemplary embodiment of the present invention.

Referring to FIG. 1, the hierarchical image processing system includes an encoding device 100 and a decoding device 150.

For the input of a high-definition picture as a source picture, the encoding device 100 outputs a coded low-definition picture and a coded residual image. A residual image before coding is defined as pixel values based on the difference between the input high-definition picture and a high-definition picture recovered in the encoding device 100.

For this purpose, the encoding device 100 includes a format downconverter 101, a Coder-Decoder (CODEC) 103, a buffer 105, a format upconverter 107, a subtractor 109, a residual mapping and scaling unit 111, and a residual encoder 113.

The format downconverter 101 receives a high-definition picture as a source picture and outputs a low-definition picture. That is, the format downconverter 101 outputs a downconverted sequence by downconverting the received high-definition picture.

The CODEC 103 encodes the downconverted sequence received from the format downconverter 101 to a bit stream of the coded low-definition picture and outputs the bit stream to the decoding device 150.

The CODEC 103 further recovers the bit stream of the coded low-definition picture and provides the recovered bit stream to the buffer 105. The low-definition picture is included in a base layer and a VC-1 or H.264 CODEC may be used as the CODEC 103.

The buffer 105 buffers the recovered low-definition picture.

The format upconverter 107 performs upconversion to recover an upconverted base layer sequence from at least one low-definition video frame received from the buffer 105. That is, the format upconverter 107 converts at least one low-definition video frame received from the buffer 105 to a high-definition picture having the resolution of the source picture. The high-definition picture upconverted by the format upconverter 107 is referred to as a "recovered high-definition picture".

To do so, the format upconverter 107 determines the number of low-definition video frames (P2I_METHOD) to be used for the upconversion, taking into account characteristics of the source picture. If the number of low-definition video frames is 2 or larger (P2I_METHOD==1), the format upconverter 107 determines a weight for each of the low-definition video frames (P2I_WEIGHTING), taking into account the characteristics of the source picture. A higher weight is allocated to a low-definition video frame with higher importance and a lower weight is allocated to a low-definition video frame with lower importance (P2I_WEIGHTING==1). If the plurality of low-definition video frames have the same importance, an identical weight is allocated to all of the low-definition video frames (P2I_WEIGHTING==0).

On the other hand, if the number of low-definition video frames for use in the upconversion is 1 (P2I_METHOD==0), no weight is considered.

The format upconverter 107 outputs the recovered high-definition picture by performing upconversion based on the determined number and weights of low-definition video frames.

The operation of converting a low-definition picture to a high-definition picture in the format upconverter 107 will be described later in greater detail.

The subtractor 109 receives the recovered high-definition picture from the format upconverter 107 and the high-definition picture being a source picture and calculates the residual between the two high-definition pictures. The residual corresponds to a residual image.

The residual mapping and scaling unit 111 maps the residual received from the subtractor 109 to 8 bits and scales the mapped residual. The residual encoder 113 encodes a bit stream corresponding to the residual image received from the residual mapping and scaling unit 111 and outputs the resulting enhancement layer bit stream to the decoding device 150.

The decoding device 150 receives the coded base layer bit stream and the enhancement layer bit stream from the encoding device 100 and outputs a recovered low-definition picture and a recovered high-definition picture.

To this end, the decoding device 150 includes a base layer decoder 151, a format upconverter 153, a residual decoder 155, a residual mapping and scaling unit 157, and an adder 159.

The base layer decoder 151 receives the base layer bit stream from the encoding device 100 and decodes the received base layer bit stream, thereby recovering a decoded low-definition picture. To decode the base layer bit stream, a VC-1 or H.264 decoder may be used as the base layer decoder 151.

The low-definition picture recovered by the base layer decoder 151 is output as a final output of the decoding device 150 or provided to the format upconverter 153.

The format upconverter 153 acquires an upconverted base layer sequence by upconverting the recovered low-definition picture.

The format upconverter 153 upconverts the recovered low-definition picture to a high-definition picture, taking into account characteristics of the source picture, like the format upconverter 107 of the encoding device 100.

The residual decoder 155 receives the bit stream of the coded residual image, that is, the enhancement layer bit stream from the encoding device 100, decodes the enhancement layer bit stream, and outputs a recovered residual image. As stated before, the residual image corresponds to the residual between the source picture and the high-definition picture recovered by the encoding device 100.

The residual mapping and scaling unit 157 maps and scales the recovered residual image received from the residual decoder 155 with an original bit depth.

The adder 159 recovers a high-definition picture that approximates the source picture by adding the upconverted base layer sequence received from the format upconverter 153 to the recovered residual image received from the residual mapping and scaling unit 157. The recovered high-definition picture belongs to an enhancement layer.

The high-definition picture recovered by the adder 159 is output as another final output of the decoding device 150.

The pixel values of the residual image that the encoding device 100 provides to the decoding device 150 are preferably, but not necessarily, small in the image processing system. To achieve small pixel values of the residual image, a high-definition picture having a small residual with respect to a source picture should be recovered in the encoding device 100. Specifically, upconversion should be optimized in the format upconverter 107 of the encoding device 100 and the format upconverter 153 of the decoding device 150.

B. Image Conversion Apparatus

The configuration and operation of an image conversion apparatus for optimizing upconversion, that is, minimizing the pixel values of a residual image according to an exemplary embodiment of the present invention will be described in detail. The image conversion apparatus corresponds to the format upconverters 107 and 153 illustrated in FIG. 1.

B-1. Configuration of the Image Conversion Apparatus

The configuration of an image conversion apparatus for generating a high-definition video frame using one or more low-definition video frames according to an exemplary embodiment of the present invention will be described below in detail.

Figure 2:
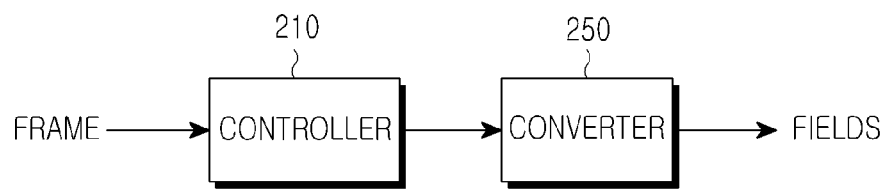
FIG. 2 is a block diagram of an image conversion apparatus according to an exemplary embodiment of the present invention.

FIG. 2 is a block diagram of an image conversion apparatus for converting a low-definition picture to a high-definition picture according to an exemplary embodiment of the present invention.

Referring to FIG. 2, a controller 210 determines the number of low-definition video frames for use in upconverting a low-definition picture to a high-definition picture according to characteristics of a source picture.

For example, if a high-definition picture as a source picture has similar characteristics to a low-definition picture, the controller 210 determines to perform upconversion using one low-definition video frame. On the other hand, if a high-definition picture as a source picture has different characteristics from a low-definition picture, the controller 210 determines to perform upconversion using a plurality of low-definition video frames.

Once the controller 210 determines to use a plurality of low-definition video frames for upconversion according to the characteristics of the source picture, it further determines how to use the plurality of low-definition video frames. Specifically, the controller 210 determines a weighting ratio, taking into account the importance of the plurality of low-definition video frames.

For instance, if the source picture has similar motion information to a general high-definition picture, the same importance, that is, the same weight is given to the plurality of low-definition video frames (P2I_WEIGHTING==0).

However, if the plurality of low-definition video frames have different importance (P2I_WEIGHTING==1), the controller 210 determines a weighting ratio so that different weights may be allocated to the plurality of low-definition video frames. That is, a higher weight is given to a low-definition video frame having relatively high importance than a low-definition video frame having relatively low importance.

To be more specific, when determining that two or more frames are needed for upconversion, the controller 210 determines a weighting ratio, taking into account the importance of each video frame. The weighting ratio specifies a weight for each of the frames. In other words, to recover a high-definition picture from the plurality of frames corresponding to a low-definition picture, a weight may be given to each of the plurality of frames according to the degree to which the frame affects the high-definition picture to be recovered.

For example, on the assumption that two frames are taken to recover a high-definition picture, a weighting ratio such as 5:3, 6:3, 5:4 or 6:4 may be determined according to the importance of first and second frames. It is noted from the exemplary weighting ratios that the first frame is of relatively high importance, compared to the second frame. This means that the first frame affects recovery of the high-definition picture more than the second frame.

Notably, the first and second frames should be consecutive in time and the first frame is earlier than the second frame. That is, if the first frame is at a time $t_1$, the second frame is at a time $t_2$ and $t_1$ is earlier than $t_2$. The disparity between the times $t_1$ and $t_2$ roughly corresponds to the time interval between displaying of the first frame on a screen and displaying of the second frame on the screen, when the screen is displayed by progressive scanning.

When the controller 210 determines information for upconversion as described above, it provides the determined upconversion information to a converter 250. If the controller 210 determines to use a single low-definition video frame for the upconversion, it notifies the converter 250 that the number of low-definition video frames for use in the upconversion is 1.

On the other hand, if the controller 210 determines to use a plurality of low-definition video frames for the upconversion, it provides information about the weight of each low-definition video frame or a weighting ratio along with information about the number of low-definition video frames to be used for the upconversion to the converter 250. If the same weight is given to the plurality of low-definition video frames, the weighting ratio may not be provided to the converter 250.

The converter 250 performs upconversion using the upconversion information received from the controller 210 in order to recover the high-definition picture from the low-definition picture. The upconversion information includes information about the number of low-definition video frames to be used for upconversion, and the weight of each low-definition video frame or a weighting ratio. The information about the weight of each low-definition video frame or the weighting ratio is included only when two or more low-definition video frames are used for the upconversion. However, even though two or more low-definition video frames are used for the upconversion, if the same weight is given to each low-definition video frame, the information about the weight of each low-definition video frame or the weighting ratio may not be included in the upconversion information.

To be more specific, if a single low-definition video frame is indicated by the upconversion information, the converter 250 generates a top field and a bottom field that form one frame of a high-definition picture using only a low-definition video frame at a current point of time (hereinafter "current time"). The top field exists at the same time as the low-definition video frame and the bottom field exists at a time between the low-definition video frame and a low-definition video frame at a next point in time (hereinafter "next time").

A detailed description will be made of the operation for generating the top and bottom fields of one frame of a high-definition picture using only one low-definition video frame, with reference to FIG. 5.

On the other hand, if the upconversion information indicates 2 or a larger number as the number of low-definition video frames for use in upconversion and the weight of each low-definition video frame or a weighting ratio, the converter 250 generates a top field and a bottom field that form a frame of the high-definition picture using a plurality of low-definition video frames. The top field exists at the same time as the low-definition video frame and the bottom field exists at a time between the low-definition video frame and a low-definition video frame at the next time.

For example, let us assume that two low-definition video frames are used for upconversion. The two low-definition video frames are a current low-definition video frame and the next low-definition video frame in time.

The converter 250 generates a top field using the low-definition video frame at the current time and then generates a bottom field according to the weights or weighting ratio of the two low-definition video frames.

If an identical weight is given to the two low-definition video frames, the converter 250 uses the low-definition video frames at the same rate in generating the bottom field. On the contrary, if different weights are given to the two low-definition video frames, the converter 250 uses the low-definition video frames with different emphasis, that is, at the weighting ratio in generating the bottom field.

A detailed description will be made of the operation for generating the top field and bottom field of one frame of a high-definition picture using two low-definition video frames, with reference to FIG. 6.

B-2. Operations of the Image Conversion Apparatus

Operations of the image conversion apparatus for generating a high-definition video frame using one or more low-definition video frames according to an exemplary embodiment of the present invention will be described below in detail.

Figure 3:
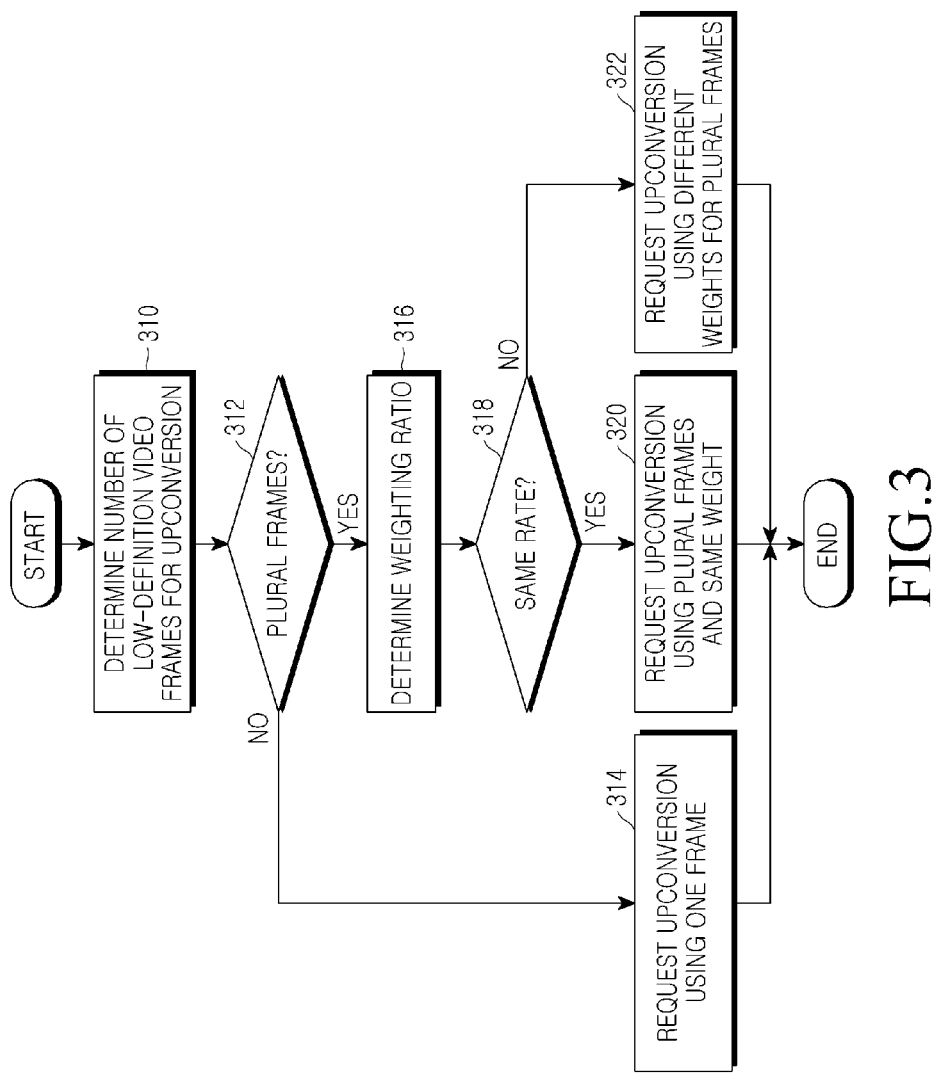
FIG. 3 is a flowchart illustrating a control operation of a controller in the image conversion apparatus according to an exemplary embodiment of the present invention.

FIG. 3 is a flowchart illustrating a control operation of the controller in the image conversion apparatus according to an exemplary embodiment of the present invention.

Referring to FIG. 3, the controller determines the number of low-definition video frames for use in upconversion in step 310. That is, the controller determines whether to perform upconversion using one or more low-definition video frames, taking into account characteristics of a source picture.

More specifically, it is assumed that a low-definition picture (e.g. a progressively scanned picture) exists at the same time as one of first and second fields that form one frame of a high-definition picture. The one field is referred to as a top field, hereinafter.

When the low-definition picture is converted to the high-definition picture, the other field (hereinafter, referred to as a bottom field) should be created at a different time from the top field. However, it is difficult to generate the bottom field using only one low-definition video frame, taking into account the time difference between the top field and the bottom field.

Therefore, if a high-definition picture being a source picture has characteristics that are approximate to those of a low-definition picture that there is no need for considering the time difference, the upconversion is preferably, but not necessarily, performed using a single low-definition video frame.

However, if the top and bottom fields of one frame of a high-definition picture (referred to as a "high-definition video frame") as a source picture are apart enough from each other in time, the upconversion is preferably, but not necessarily, performed using two low-definition video frames successive in time. That is, in an exemplary embodiment, the first and second top fields are generated using the respective consecutive low-definition video frames and a bottom field being the counterpart of the first top field is generated using both the low-definition video frames.

Accordingly, the controller determines whether to perform upconversion using a single low-definition video frame or two low-definition video frames, taking into account characteristics of the source picture such as the time disparity between frames.

In step 312, the controller determines whether the determined number of low-definition video frames is 1, or 2 or larger.

If it has determined to use a single low-definition video frame for upconversion, the controller requests the converter to perform the upconversion using one low-definition video frame in step 314.

On the other hand, if it has determined to use a plurality of low-definition video frames for upconversion, the controller determines weights for the low-definition video frames, that is, a weighting ratio in step 316.

For instance, if the controller has determined to use two low-definition video frames for upconversion, it determines how to interpolate a high-definition picture using a low-definition video frame at a current time and a low-definition video frame at the next time. This determination may be made using the characteristics of the source picture.

If the two low-definition video frames have the same importance, the controller determines a weighting ratio so that the low-definition video frames have the same weight.

For example, if the high-definition picture being a source picture has the same characteristics as a general high-definition picture, it is preferred, but not necessary, to interpolate the high-definition picture by applying the same importance to the two low-definition video frames. The characteristics of the general high-definition picture may be motion information about the source picture.

However, it may occur in some cases that a better result is achieved by differentiating importance for the two low-definition video frames. In this case, a weighting ratio is preferably, but not necessarily, determined so that different weights are given to the two low-definition video frames.

For example, if a background image is clear or has too large a motion like a low-definition picture in the source picture, a better result may be achieved by applying higher importance to a low-definition video frame at a current time than a low-definition video frame at the next time. In this case, a weighting ratio is determined so that a higher weight is given to the low-definition video frame at the current time than the low-definition video frame at the next time.

Whether the better result will be achieved may be determined based on the similarity between the source picture and the high-definition picture interpolated using the two low-definition video frames. That is, a better result may be acquired if the two pictures are more similar. In other words, as the similarity increases, the pixel values of a residual image between the source picture and the high-definition picture may be decreased.

In general, if the pixel values of a residual image decrease in the hierarchical image processing system, this means that the number of an enhancement layer bit stream generated by the encoding device 100 decreases.

After determining the weights of the low-definition video frames (i.e. the weighting ratio), the controller determines whether the same weight has been allocated to the low-definition video frames in step 318.

If determining that the same weight has been allocated to the low-definition video frames, the controller requests the converter to perform upconversion using the low-definition video frames and the identical weight allocated to the low-definition video frames in step 320.

On the contrary, if determining that different weights have been allocated to the low-definition video frames, the controller requests the converter to perform upconversion using the low-definition video frames and the weights allocated to the low-definition video frames (i.e. the weighting ratio) in step 322.

Figure 4:
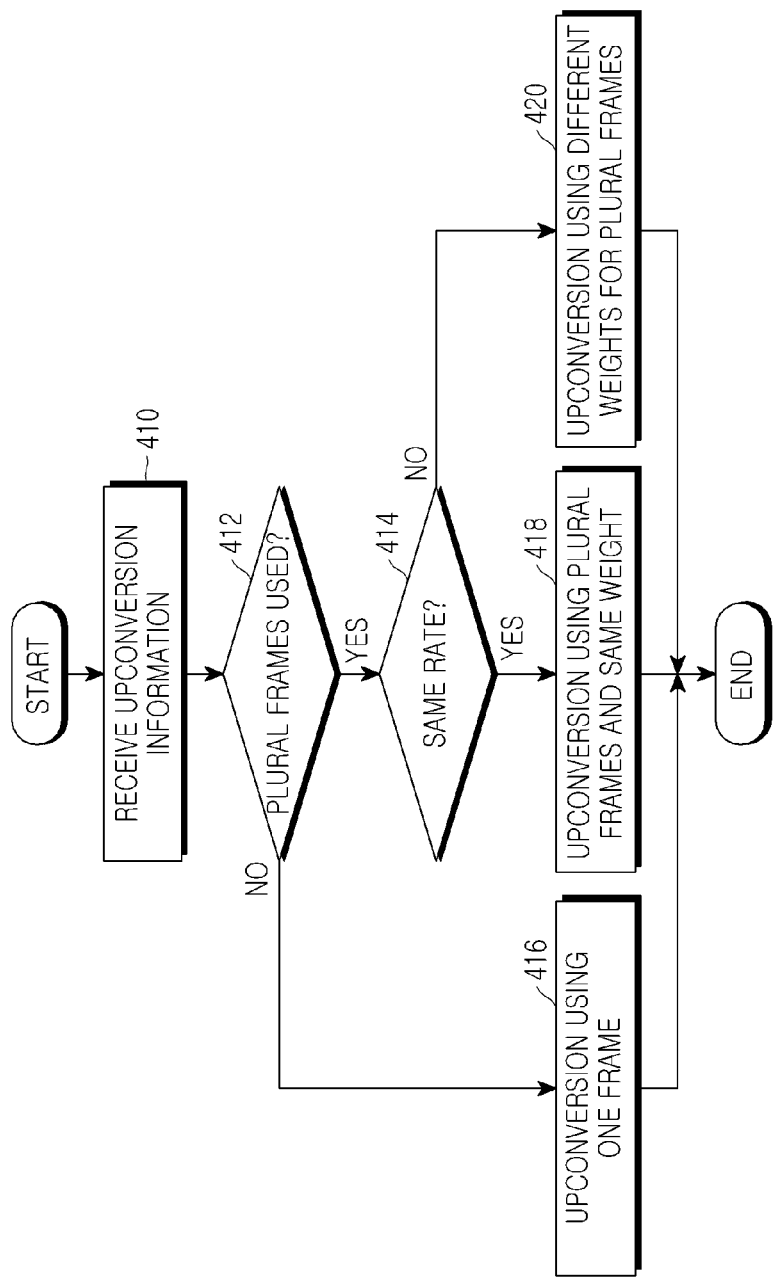
FIG. 4 is a flowchart illustrating a control operation of a converter in the image conversion apparatus according to an exemplary embodiment of the present invention.

FIG. 4 is a flowchart illustrating a control operation of the converter in the image conversion apparatus according to an exemplary embodiment of the present invention.

Referring to FIG. 4, the converter receives upconversion information from the controller in step 410. The upconversion information includes the number of low-definition video frames to be used for upconversion and the weight of each low-definition video frame (or a weighting ratio). The controller may provide information about the weight of each low-definition video frame (or a weighting ratio) in the upconversion information, only when a plurality of low-definition video frames are to be used for upconversion.

In step 412, the converter determines whether the upconversion information indicates a single low-definition video frame or a plurality of low-definition video frames for use in upconversion.

If the upconversion information indicates a single low-definition video frame, the converter generates a high-definition video frame by upconverting a single low-definition video frame at a current time in step 416. The high-definition video frame includes a top field and a bottom field. Therefore, the converter generates the top and bottom fields of the single high-definition video frame by the upconversion in step 416.

On the contrary, if the upconversion information indicates a plurality of low-definition video frames, the converter determines whether the same or different weights are allocated to the plurality of low-definition video frames for upconversion in step 414.

When determining that the same weight is applied to the plurality of low-definition video frames, the converter generates a high-definition video frame using the plurality of low-definition video frames at the same rate, that is, by applying the same weight to the plurality of low-definition video frames.

On the other hand, when determining that different weights are applied to the plurality of low-definition video frames, the converter generates a high-definition video frame using the plurality of low-definition video frames according to the different weights of the plurality of low-definition video frames in step 420. That is, when generating the high-definition video frame, the converter considers a low-definition video frame having a higher weight more than a low-definition video frame having a lower weight.

The plurality of low-definition video frames used for upconversion may be a low-definition video frame at a current time and a low-definition video frame at the previous or next time.

If two low-definition video frames are used for upconversion, they are preferably, but not necessarily, a low-definition video frame at a current time and a low-definition video frame at the next time.

C. Examples of Image Conversion

Examples of generating a high-definition video frame using one or two low-definition video frames according to exemplary embodiments of the present invention will be described below.

Figure 5:
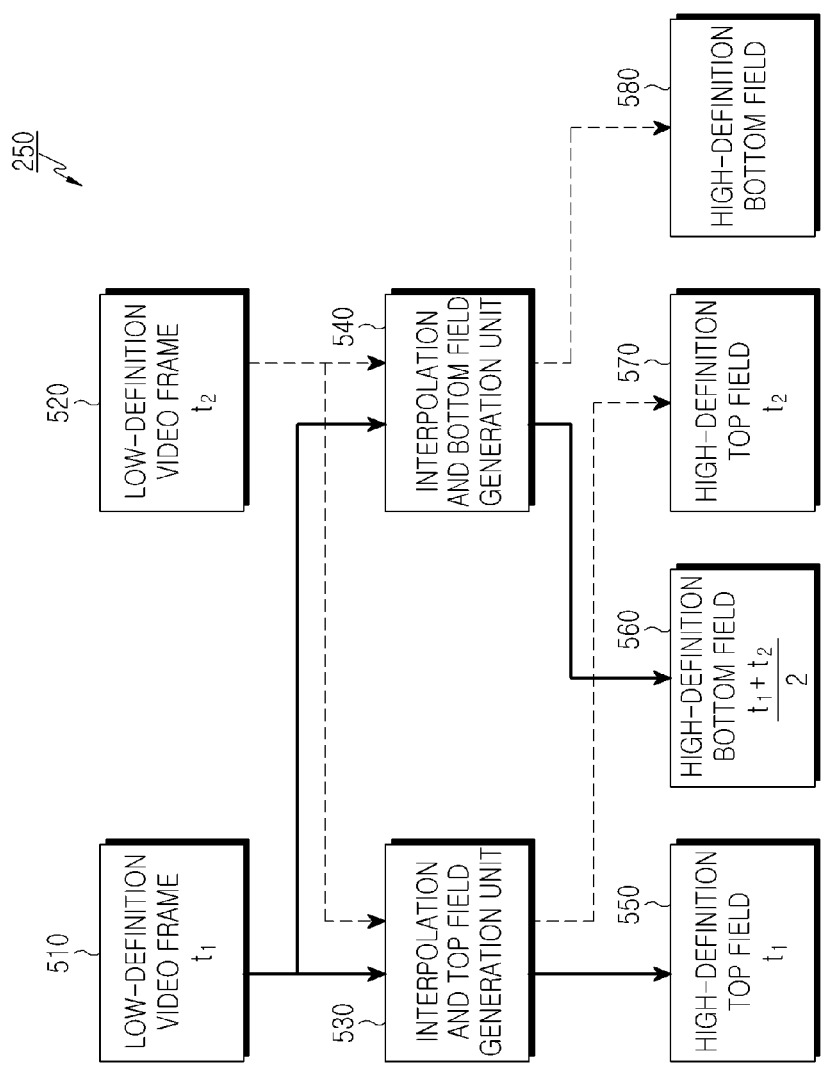
FIG. 5 illustrates an image conversion operation for generating one high-definition video frame using one low-definition video frame in the converter according to an exemplary embodiment of the present invention.

FIG. 5 illustrates an image conversion operation for generating one high-definition video frame using one low-definition video frame in the converter of the image conversion apparatus according to an exemplary embodiment of the present invention.

Referring to FIG. 5, a converter 250 includes an interpolation and top field generation unit 530 and an interpolation and bottom field generation unit 540. The interpolation and top field generation unit 530 and the interpolation and bottom field generation unit 540 may be incorporated into a single device.

The converter 250 generates two fields 550 and 560 or 570 and 580 using a low-definition video frame 510 at a time $t_1$ or a low-definition video frame 520 at time a time $t_2$. A high-definition picture generated at each time by the converter 250 is a high-definition video frame including the top field 550 or 570 and the bottom field 560 or 580.

To be more specific, the interpolation and top field generation unit 530 generates an interpolation picture of the same size as the top field of a high-definition video frame by interpolating the input low-definition picture 510 or 520 at each time $t_1$ or $t_2$, taking into account the size of a base layer low-definition picture and the size of an enhancement layer high-definition picture. The interpolation picture is a picture P upsampled from the low-definition picture 510 or 520.

For example, the base layer low-definition picture may be of size 20×20 and the interpolation picture and the top field of the enhancement layer high-definition picture may be of size 40×80.

The interpolation and top field generation unit 530 generates the high-definition top field 550 or 570 of a high-definition video frame using the interpolation picture. The high-definition top field 550 or 570 is placed at the same time $t_1$ or $t_2$ as the low-definition video frame 510 or 520.

For example, the high-definition top field 550 or 570, $P_C[2i]$ may be generated by $$P_C[2i]=(32EP_P[i]+16)//32 \qquad \text{EQN. (1)}$$

where $P_C$ denotes the pixels of the top field 550 or 570 of the high-definition picture, $P_P$ denotes the pixels of a picture P upsampled from the single low-definition video frame 510 or 520, and i denotes the index of a pixel of the pixels $P_P$.

The interpolation and bottom field generation unit 540 generates an interpolation picture of the same size as the bottom field of the high-definition video frame by interpolating the input low-definition picture 510 or 520 at each time $t_1$ or $t_2$, taking into account the size of a base layer low-definition picture and the size of an enhancement layer high-definition picture. The interpolation picture is a picture P upsampled from the low-definition picture 510 or 520.

For example, the base layer low-definition picture may be of size 20×20 and the interpolation picture and the bottom field of the enhancement layer high-definition picture may be of size 40×80.

The interpolation and bottom field generation unit 540 generates the high-definition bottom field 560 or 580 of the high-definition video frame using the interpolation picture. The high-definition bottom field 560 or 580 is apart from the high-definition top field 550 or 570 in time. For example, the high-definition bottom field 560 or 580 is placed at a time $$\left(\text{e.g. } \frac{t_1+t_2}{2}\right)$$

between the time $t_1$ of the low-definition video frame 510 and the time $t_2$ of the low-definition video frame 520.

For example, the high-definition bottom field 560 or 580, $P_C[2i+1]$ may be generated by $$P_C[2i+1]=(P_P[i-3]-5EP_P[i-2]+20EP_P[i-1]+20EP_P[i]-5EP_P[i+1]+P_P[i+2]+16)//32 \qquad \text{EQN (2A)}$$

or $$P_C[2i+1]=(16EP_P[i-1]+16EP_P[i]+16)//32 \qquad \text{EQN. (2B)}$$

where $P_C$ denotes the pixels of the bottom field 560 or 580 of the high-definition definition picture, $P_P$ denotes the pixels of a picture P upsampled from the single low-definition video frame 510 or 520, and i denotes the index of a pixel of the pixels $P_P$.

In the above description, t may denote a time at which an image is displayed on a screen. It may be further contemplated that the bottom field is at the same time as the low-definition video frame and the top field is at a time earlier than the bottom field.

Figure 6:
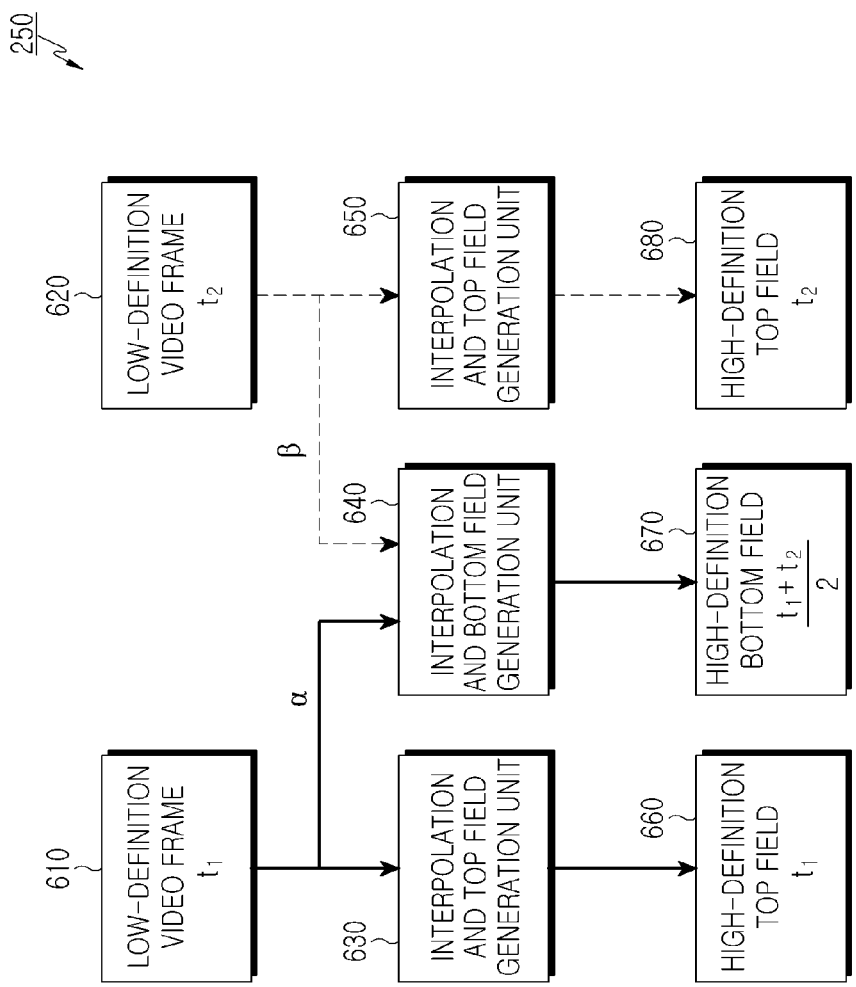
FIG. 6 illustrates an image conversion operation for generating one high-definition video frame using two low-definition video frames in the converter according to an exemplary embodiment of the present invention.

FIG. 6 illustrates an image conversion operation for generating one high-definition video frame using two low-definition video frames in the converter of the image conversion apparatus according to an exemplary embodiment of the present invention.

Referring to FIG. 6, the converter 250 includes interpolation and top field generation units 630 and 650, and an interpolation and bottom field generation units 640. The interpolation and top field generation units 630 and 650 and the interpolation and bottom field generation unit 640 may be incorporated into a single device. While the interpolation and top field generation units 630 and 650 are shown to be used for different times in FIG. 6, one interpolation and top field generation unit may process low-definition pictures of different times.

The converter 250 generates one of two fields 660 and 670, that is, top and bottom fields 660 and 670 for a high-definition picture at a predetermined time using a low-definition video frame 610 or 620 at each time $t_1$ or $t_2$. The generated field may be the top field 660.

The converter 250 generates the other field for the high-definition picture using the low-definition pictures 610 and 620 at the two times $t_1$ and $t_2$. The other field may be the bottom field 670.

Therefore, the high-definition picture generated at each time by the converter 250 may correspond to one high-definition video frame formed with the top field 660 and the bottom field 670.

To be more specific, the interpolation and top field generation unit 630 or 650 generates an interpolation picture of the same size as the top field of a high-definition video frame by interpolating an input low-definition picture at each time $t_1$ or $t_2$, taking into account the size of a base layer low-definition picture and the size of an enhancement layer high-definition picture. The interpolation picture is a picture P upsampled from the low-definition picture 610 or 620.

For example, the base layer low-definition picture may be of size 20×20 and the interpolation picture and the top field of the enhancement layer high-definition picture may be of size 40×80.

The interpolation and top field generation unit 630 or 650 generates the high-definition top field 660 or 680 of a high-definition video frame using the interpolation picture. The high-definition top field 660 or 680 is placed at the same time $t_1$ or $t_2$ as the low-definition video frame 610 or 620.

For example, the high-definition top field 650 or 680 may be generated by Equation (1).

The interpolation and top field generation unit 640 generates an interpolation picture of the same size as the bottom field of the high-definition video frame by interpolating the low-definition video frames at the times $t_1$ and $t_2$ at a given weighting ratio. The interpolation picture is a picture P upsampled from the low-definition picture 610 and 620.

The weighting ratio ($\alpha$:$\beta$) given for the interpolation is determined based on the importance of the base layer low-definition video frame at the current time $t_1$ and the importance of the base layer low-definition video frame at the next time $t_2$. Herein, $\alpha$ is a weight given to the base layer low-definition video frame at the current time $t_1$ and $\beta$ is a weight given to the base layer low-definition video frame at the next time $t_2$. The sum of the weights $\alpha$ and $\beta$ may be 1.

Therefore, when generating the interpolation picture, the interpolation and bottom field generation unit 640 makes a low-definition video frame having a relatively high weight affect more than a low-definition video frame having a relatively low weight. That is, the interpolation and bottom field generation unit 640 considers the low-definition video frame having a relatively high weight more in generating the interpolation picture.

However, if the base layer low-definition video frames at the current and next times $t_1$ and $t_2$ have the same weight, they are used at the same rate in generating the interpolation picture. The case of the same weight covers a case of not using any weight.

The interpolation and bottom field generation unit 640 generates the bottom field 670 using the interpolation picture. The bottom field 670 is apart from the top field 660 in time. For example, the bottom field 670 is placed at a time $$\left(e.g. \ \frac{t_1 + t_2}{2}\right)$$

between the time $t_1$ of the low-definition video frame 610 and the time $t_2$ of the low-definition video frame 620.

In the above description, t may denote a time at which an image is displayed on a screen. It may be further contemplated that the bottom field is at the same time as the low-definition video frame and the top field is at a time earlier than the bottom field.

For example, the bottom field 670, $P_C[2i+1]$ may be generated by $$P_C[2i+1]=(P_P[i-1]+P_P[i]+P_{P,NEXT}[i-1]+P_{P,NEXT}[i]+2)//4 \quad \text{EQN. (3)}$$

or $$P_C[2i+1]=(\alpha E P_P[i-1]+\alpha E P_P[i]+P_{P,NEXT}[i-1]+P_{P,NEXT}[i]+\alpha+1)//\{2(\alpha+1)\} \quad \text{EQN. (4)}$$

where $P_C$ denotes the pixels of the bottom field 670 of the high-definition picture, $P_P$ denotes the pixels of the picture P upsampled from the preceding low-definition video frame 610, $P_{P,NEXT}$ denotes the pixels of a picture $P_{NEXT}$ upsampled from the following low-definition video frame 620, i denotes the index of a pixel of the pixels $P_P$ or a pixel of pixels $P_{P,NEXT}$, and $\alpha$ denotes a weight.

Equation (3) is available when a bottom field is generated with the same weight to a plurality of low-definition video frames or without any weight to the plurality of low-definition video frames. Equation (4) is applicable for generation of a bottom field with different weights given to a plurality of low-definition video frames.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for converting an image in an image processing system, comprising:
   determining to convert a low-definition picture obtained from a source picture to a high-definition picture using a plurality of low-definition video frames of the low-definition picture, based on whether an image characteristic of the source picture is similar to an image characteristic of a high-definition picture or an image characteristic of a low-definition picture;
   determining weights for the plurality of low-definition video frames; and
   generating one of two image fields that form a high-definition video frame of the high-definition video picture using the plurality of low-definition video frames according to the weights of the plurality of low-definition video frames.

2. The method of claim 1, wherein a number of the plurality of low-definition video frames is two, the two image fields that form the high-definition video frame are a top field and a bottom field, and the generated one of two image fields is the bottom field.

3. The method of claim 2, wherein the generating comprises:
   generating an interpolation picture of a first low-definition video frame being one of the two low-definition video frames used for converting the low-definition picture to the high-definition picture and an interpolation picture of a second low-definition video frame being another of the two low-definition video frames, based on the weights determined for the first and the second low-definition video frames; and
   generating the bottom field using the interpolation pictures of the first and the second low-definition video frames, wherein a time of the first low-definition video frame is earlier than a time of the second low-definition video frame, and the bottom field is at a time between the times of the first and the second low-definition video frames.

4. The method of claim 2, wherein the high-definition picture is an interlaced-scanned picture and the low-definition picture is a progressively scanned picture.

5. The method of claim 4, wherein the determining the weights comprises determining the weights of the plurality of low-definition video frames according to another image characteristic of the source picture, and the another image characteristic of the source picture is information used for determining importance of the plurality of low-definition video frames or motion information about the source picture.

6. An image conversion apparatus in an image processing system, comprising:
a controller configured to determine to convert a low-definition picture obtained from a source picture to a high-definition picture using a plurality of low-definition video frames of the low-definition picture, based on whether an image characteristic of the source picture is similar to an image characteristic of a high-definition picture or an image characteristic of a low-definition picture, and determine weights for the plurality of low-definition video frames; and
a converter configured to generate one of two image fields that form a high-definition video frame of the high-definition video picture using the plurality of low-definition video frames according to the weights of the plurality of low-definition video frames.

7. The image conversion apparatus of claim 6, wherein a number of the plurality of low-definition video frames is two, the two image fields that form one high-definition video frame are a top field and a bottom field, and the generated one of two image fields is the bottom field.

8. The image conversion apparatus of claim 7, wherein the converter generates an interpolation picture of a first low-definition video frame being one of the two low-definition video frames used for converting the low-definition picture to the high-definition picture and an interpolation picture of a second low-definition video frame being another of the two low-definition video frames, based on the weights determined for the first and the second low-definition video frames, and generates the bottom field using the interpolation pictures of the first and the second low-definition video frames,
wherein a time of the first low-definition video frame is earlier than a time of the second low-definition video frame, and the bottom field is at a time between the times of the first and the second low-definition video frames.

9. The image conversion apparatus of claim 7, wherein the high-definition picture is an interlaced-scanned picture and the low-definition picture is a progressively scanned picture.

10. The image conversion apparatus of claim 9, wherein the controller determines the weights of the plurality of low-definition video frames according to another image characteristic of the source picture, and the another image characteristic of the source picture is information used for determining importance of the plurality of low-definition video frames or motion information about the source picture.

11. A method for converting an image in an image processing system, comprising:
first generating a top field and a bottom field that form a high-definition picture, using a single low-definition video frame, if the high-definition picture is to be generated using the single low-definition video frame;
second generating comprising generating the top field of the high-definition picture using a preceding low-definition video frame between two consecutive low-definition video frames and generating the bottom field of the high-definition picture using the two consecutive low-definition video frames, if the high-definition picture is to be generated using the two consecutive low-definition video frames without applying weights to the two consecutive low-definition video frames; and
third generating comprising generating the top field of the high-definition picture using the preceding low-definition video frame between the two consecutive low-definition video frames and generating the bottom field of the high-definition picture by applying the weights to the two consecutive low-definition video frames, if the high-definition picture is to be generated using the two consecutive low-definition video frames according to the weights for the two consecutive low-definition video frames.

12. The method of claim 11, wherein if the high-definition picture is to be generated using the single low-definition video frame, the first generating comprises generating the top field $P_C[2i]$ of the high-definition picture by $(32EP_P[i]+16)//32$, and generating the bottom field $P_C[2i+1]$ of the high-definition picture by $(P_P[i-3]-5EP_P[i-2]+20EP_P[i-1]+20EP_P[i]-5EP_P[i+1]+P_P[i+2]+16)//32$ or $(16EP_P[i-1]+16EP_P[i]+16)//32$ where $P_C$ denotes pixels in the top and the bottom fields of the high-definition picture, $P_P$ denotes pixels of a picture P upsampled from the single low-definition video frame, and i denotes an index of a pixel of pixels $P_P$.

13. The method of claim 11, wherein if the high-definition picture is to be generated using the two consecutive low-definition video frames without applying weights to the two consecutive low-definition video frames, the second generating comprises generating the top field $P_C[2i]$ of the high-definition picture by $(32EP_P[i]+16)//32$, and generating the bottom field $P_C[2i+1]$ of the high-definition picture by $(P_P[i-1]+P_P[i]+P_{P,NEXT}[i-1]+P_{P,NEXT}[i]+2)//4$ where $P_C$ denotes pixels in the top and the bottom fields of the high-definition picture, $P_P$ denotes pixels of a picture P upsampled from the preceding low-definition video frame between the two consecutive low-definition video frames, $P_{P,NEXT}$ denotes pixels of a picture $P_{P,NEXT}$ upsampled from a following low-definition video frame between the two consecutive low-definition video frames, and i denotes an index of a pixel of the pixels $P_P$ or a pixel of pixels $P_{P,NEXT}$.

14. The method of claim 11, wherein if the high-definition picture is to be generated using the two consecutive low-definition video frames according to the weights for the two consecutive low-definition video frames, the third generating comprises generating the top field $P_C[2i]$ of the high-definition picture by $(32EP_P[i]+16)//32$, and generating the bottom field $P_C[2i+1]$ of the high-definition picture by $(\alpha EP_P[i-1]+\alpha EP_P[i]+P_{P,NEXT}[i-1]+P_{P,NEXT}[i]+\alpha+1)//\{2(\alpha+1)\}$ where $P_C$ denotes pixels in the top and the bottom fields of the high-definition picture, $P_P$ denotes pixels of a picture P upsampled from the preceding low-definition video frame between the two consecutive low-definition video frames, $P_{P,NEXT}$ denotes pixels of a picture $P_{NEXT}$ upsampled from a following low-definition video frame between the two consecutive low-definition video frames, i denotes an index of a pixel of pixels $P_P$ or a pixel of pixels $P_{P,NEXT}$ and $\alpha$ denotes a weight.

15. The method of claim 11, wherein the high-definition picture is an interlaced-scanned picture and the low-definition video frames are progressively scanned video frames.

16. An image conversion apparatus in an image processing system, comprising:
a top field generator which generates a top field of a high-definition picture using a single low-definition video frame or using a preceding low-definition video frame between two consecutive low-definition video frames; and a bottom field generator which generates a bottom field of the high-definition picture using the single low-definition video frame or the two consecutive low-definition video frames, wherein the top field generator generates the top field of the high-definition picture using the single low-definition video frame, if the high-definition picture is to be generated using the single low-definition video frame, generates the top field of the high-definition picture using the preceding low-definition video frame between the two consecutive low-definition video frames, if the high-definition picture is to be generated using the two consecutive low-definition video frames without applying weights to the two consecutive low-definition video frames, and generates the top field of the high-definition picture using the preceding low-definition video frame between the two consecutive low-definition video frames, if the high-definition picture is to be generated using the two consecutive low-definition video frames according to the weights to the two consecutive low-definition video frames, and the bottom field generator generates the bottom field of the high-definition picture using the single low-definition video frame, if the high-definition picture is to be generated using the single low-definition video frame, generates the bottom field of the high-definition picture using the two consecutive low-definition video frames, if the high-definition picture is to be generated using the two consecutive low-definition video frames without applying weights to the two consecutive low-definition video frames, and generates the bottom field of the high-definition picture by applying the weights to the two consecutive low-definition video frames, if the high-definition picture is to be generated using the two consecutive low-definition video frames according to the weights for the two consecutive low-definition video frames.

17. The image conversion apparatus of claim 16, wherein the top field generator generates the top field $P_C[2i]$ of the high-definition picture by $(32EP_P[i]+16)//32$ where $P_C$ denotes pixels in the top field of the high-definition picture, $P_P$ denotes pixels of a picture P upsampled from the single low-definition video frame or the preceding low-definition video frame between the two consecutive low-definition video frames, and i denotes an index of a pixel of pixels $P_P$.

18. The image conversion apparatus of claim 16, wherein the bottom field generator generates the bottom field $P_C[2i+1]$ of the high-definition picture by $(P_P[i-3]-5EP_P[i-2]+20EP_P[i-1]+20EP_P[i]-5EP_P[i+1]+P_P[i+2]+16)//32$ or $(16EP_P[i-1]+16EP_P[i]+16)//32$, if the high-definition picture is to be generated using the single low-definition video frame, by $(P_P[i-1]+P_P[i]+P_{P,NEXT}[i-1]+P_{P,NEXT}[i]+2)//4$ if the high-definition picture is to be generated using the two consecutive low-definition video frames without applying weights to the two consecutive low-definition video frames, and by $(\alpha EP_P[i-1]+\alpha EP_P[i]+P_{P,NEXT}[i-1]+P_{P,NEXT}[i]+\alpha+1)//\{2(\alpha+1)\}$ if the high-definition picture is to be generated using the two consecutive low-definition video frames according to the weights for the two consecutive low-definition video frames, wherein $P_C$ denotes pixels in the top and the bottom fields of the high-definition picture, $P_P$ denotes pixels of a picture P upsampled from the preceding low-definition video frame between the two consecutive low-definition video frames, $P_{P,NEXT}$ denotes pixels of a picture $P_{NEXT}$ upsampled from a following low-definition video frame between the two consecutive low-definition video frames, i denotes an index of a pixel of pixels $P_P$ or a pixel of pixels $P_{P,NEXT}$, and $\alpha$ denotes a weight.

19. The image conversion apparatus of claim 18, wherein the high-definition picture is an interlaced-scanned picture and the low-definition video frames are progressively scanned video frames.

* * * * *